Jan. 27, 1959   R. A. KRAUS ET AL   2,870,465
METHOD OF DIE FORMING INTERNAL THREADS
Filed Aug. 22, 1957
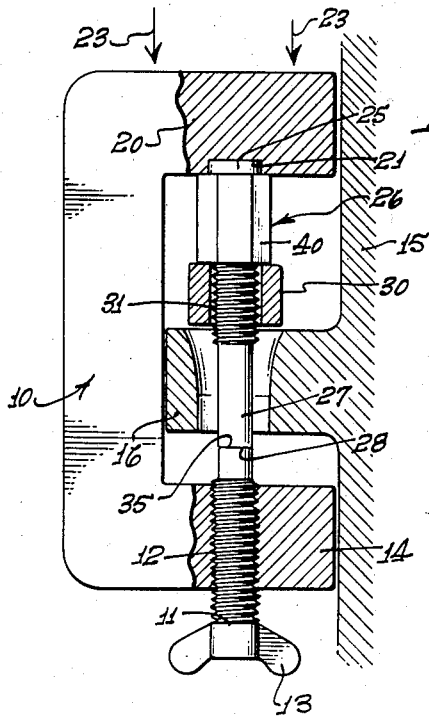
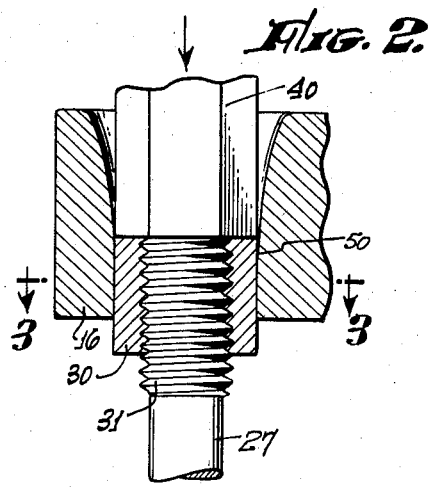
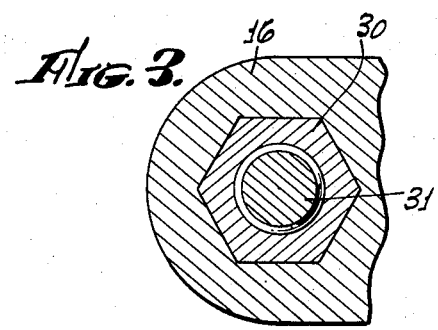
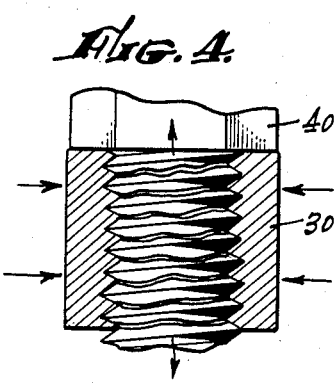
Robert A. Kraus,
Edmund J. Kraus,
INVENTORS.
By Spensley and Horn
ATTORNEYS

United States Patent Office 2,870,465
Patented Jan. 27, 1959

2,870,465

METHOD OF DIE FORMING INTERNAL THREADS

Robert A. Kraus and Edmund J. Kraus,
Redondo Beach, Calif.

Application August 22, 1957, Serial No. 679,642

4 Claims. (Cl. 10—152)

This invention relates to internally threaded objects and more particularly to a new and improved method for establishing internal threads in objects such as nuts and the like.

According to the present art there are two methods employed for producing threads in a nut blank. According to one method the thread is produced by a cutting operation. The cutting tool is a well known tap or internal cutting tool which is revolved relative to and within the nut blank to thereby remove material from the blank to form the groove which defines the thread. This thread cutting process is inherently slow and expensive, especially when applied to internally threaded pieces of small diameter as there is a relatively large amount of breakage involved in the use of the small and highly tempered tools required to cut small diameter threads.

A second process involves the use of a threaded tool former which is coextensive with a mandrel. The nut blank is placed over the thread former and the nut blank is forced through a die by applying a force upon the mandrel. In this process the thread is produced by a forming rather than a cutting operation. The metal, by compressive forces is caused to flow about the thread former without the attendant removal of metal as is involved in the die cutting operation of the first method described herein. The compression method known to the prior art, however, is not suitable in many respects and particularly for the formation of internally threaded objects of relatively small inside diameter, since the mandrel or thread former upon which the threads are formed is particularly susceptible to failure under the influence of the stresses set up by compression of the metal of the piece being formed about the mandrel. In addition, if failure does not occur the deformation of the mandrel caused by the stresses may be sufficient to result in a thread being formed which is not of the desired pitch or other configuration.

It is therefore an object of the present invention to provide an improved method for die forming internal threads in a work blank.

Another object of this invention is to provide an improved method for die forming internal threads on a nut blank.

Still another object of this invention is to provide a method for internally threading nuts which permit long tool life.

A further object of the present invention is to provide an improved compression method for internally threading nuts which reduces tool breakage.

A still further object of the present invention is to provide a method and apparatus for the manufacture of internally threaded pieces wherein the piece is accurately formed to the desired internal and external configuration and dimensions.

In accordance with the present invention the work piece to be threaded is placed upon a mandrel, part of the length of which is threaded. The mandrel is pre-loaded in compression and the work blank and mandrel are forced through a die, thereby causing the threads of the mandrel to be impressed within the blank. The tension forces induced in the mandrel as the nut passes through the die are effectively cancelled by the preloaded compressive force, thereby reducing the possibility of tool fracture and maximizing tool life.

The novel features which are believed to be characteristic of the present invention, both as to its organization and method of operation, together with further objects and advantages thereof will be better understood from the following description considered in connection with the accompanying drawing. It is to be expressly understood, however, that the drawing is for the purpose of illustration and example only, and is not intended as a definition of the limits of the invention.

In the drawing:

Figure 1 is a view partly in section showing one way in which the forming mandrel may be placed in compression according to the method of the present invention;

Figure 2 is an enlarged view of the die of Figure 1 showing the nut blank part of the way through the die;

Figure 3 is a view taken along line 3—3 of Figure 2; and

Figure 4 is a view partly in section shown to illustrate the forces involved and stresses created in a forming die.

Referring now to the drawing and more particularly to Figure 1 there is shown a presently preferred means of inducing pre-loaded compressive forces within the threaded mandrel 26. A C-clamp 10 includes a threaded member 11 which may be extended through the lower arm 14 by rotating the member 11 within the threadably mateable hole 12 by means of a wing nut 13. Protruding from the left of a rigid support 15, only partially shown, is a die member 16. Within the upper arm 20 of the clamp 10 is a depression 21 adapted to be mateable with and to receive the end 25 of the mandrel 26. A work piece, which is shown to be a nut blank 30, for purposes of illustration, is shown in position upon the thread forming portion 31 of the mandrel 26.

The nut blank 30 is positioned surrounding the threaded portion 31 of the mandrel 26 in bearing contact with the shoulder 19 of the mandrel 26. The mandrel 26 is positioned as shown in Figure 1 with its upper end 25 of reduced diameter being inserted within the hole 21.

In the assembled position as shown in Figure 1, the lower end 27 of the mandrel 26 will extend within the opening of the die 16. In the assembled position the lower surface 28 of the mandrel 26 will rest upon the upper surface 35 of the threaded member 11. Thus, it may be seen that the forming apparatus of the present invention is a substantially rigid unit comprising the C-clamp frame 20, the mandrel 26 and the pre-loading extension of the mandrel 11. The amount of pre-loading force applied to the mandrel will be dependent upon several factors discussed in detail in connection with the operation of the present invention. The mandrel 26 and particularly the male threaded portion 31 of the mandrel is formed of material which can be subjected to high temperatures without resultant deformation or elasticity. The material used and the temperature which it must withstand will be dependent upon the material from which the nut or other threaded piece is being formed as will become more apparent hereinafter. In general, however, the mandrel material must be capable of withstanding, without deformation, a temperature at which the nut blank becomes semi-fluid, that is, assumes a condition at which it will flow under pressure sufficiently to assume the internally threaded configuration.

The compression die 16 is formed with a central vertical passage therethrough having a cross sectional configuration coincident with that of the nut blank to be threaded. As may be seen in Figure 3, the illustrative example herein, nut blank 30 has a hexagonal cross-section as does the die 16. At the upper face of the die the opening is of a slightly larger cross-section than that of the nut blank to be threaded, it being increased sufficiently to permit the end 25 of mandrel 26 to be placed within hole 21 by lowering the nut blank 30 within the opening a distance at least equal to the height of hole 21. Also the increased opening will insure that the nut blank may enter the die upon a lowering of the entire clamp and mandrel assembly. Assembly of the apparatus can also be achieved by lengthening the distance between the bottom surface of the nut blank 30 and the upper surface of the die 16 sufficiently to place the end 25 of the mandrel 26 in the depression 21. The die opening is of the type well known to the art in which the side walls of the die converge to the finished outside configuration of the piece being formed. That is, the die opening converges in a downward direction until plane 50 is reached after which the walls thereof assume a parallel and vertical opening.

The relative dimensions of the work piece and the die will vary and may be determined for optimum conditions in any given application by one skilled in the art. It being necessary primarily that the work piece is sufficiently greater in outside dimensions than the dimensions of the die, to furnish metal which is forced into the male threads of the mandrel to form female threads of the piece.

It should be noted that in order to obtain a finished threaded nut or similar piece, it is preferable that the shoulder 19 have a cross-section corresponding as closely as possible in size and configuration to the cross-section of the die at the finished outside size of the nut, i. e., at the plane 50. The outside edge of the shoulder will thus be sharp and form a shearing edge which will shear off any excess metal which extrudes upward past the shoulder in the downward progress of the blank and mandrel.

Accordingly, in carrying out the method of the present invention by means of the illustrative apparatus, the nut blank 30 is heated to a flowable condition, i. e., to a red hot temperature. The heated blank is then placed upon the mandrel 26 surrounding the threaded portion 31 and the mandrel is assembled within the C-clamp 10 extending downward through the die 16 as discussed hereinbefore. The threaded member 11 is turned upward to complete the assembly, as shown in Figure 1, and to exert an axial compressive pre-loaded force upon the mandrel. After the threaded member 11 has been turned upward to exert the required pre-loading force the pre-loaded mandrel and clamp assembly is directed downward by the application of a force in the direction of the arrows 23 as shown in Figures 1 and 2. This force may be exerted by any suitable means known to the art such as a power press or the like which is not shown. The downward force exerted on the clamp 10 and thus on the mandrel 26 is sufficient that the nut blank 30 with the shoulder 19 of the mandrel 26 pressing thereupon will be forced through the die 16 with a resultant radial compressive force as may best be seen in Figure 2.

During the forming operation as each successive increment of the blank 30 is subjected to compression by passing through the parallel and narrower portion of the die 16, i. e., beneath plane 50, a combination of stresses are produced upon the mandrel which are primarily tensile stresses. Referring now to Figure 4, when these forces occur upon a mandrel which is not preloaded, the inward force of the metal being forced into the valley of the male threads will exert opposite force vectors upon the wedge shaped sides of each thread to form a tensile load at the valley of the threads where the cross-section is minimum. In addition, since the quantity of metal available in the work piece is generally greater than the amount of metal required in the final piece, the excess metal will escape by extruding past the threads 31 and will again set up a series of tensile loads upon the threaded portion of the mandrel. The complete combination of stress loads upon the mandrel will be dependent upon many variables, but it has been found that when the formation of a threaded piece of relatively small diameter is attempted by methods known to the prior art a series of fractures will occur through the reduced cross-sections of the mandrel as shown in Figure 4.

The amount of pre-loading required, accordingly, is largely empirical and may be determined for any given application by routine experiment of one skilled in the art. That is, it will be dependent upon such factors as the size of the piece being formed and the material of which it is formed, the depth of the thread, the temperature utilized in forming, the coefficient of friction between the blank 30 and die 16, and other similar factors. Thus, the pre-loaded compressive force exerted upon the mandrel is such that the compressive forces within the mandrel are sufficient to counter the tensile forces created within the mandrel during compression of the piece being formed. That is, the compressive forces are preferably equal to or greater than the tensile forces created but can be less than the tensile forces so long as the resultant tensile forces are not sufficient to cause fracture or other failure. In addition to the prevention of mandrel fracture or failure it should be noted that by means of the present invention deformation of the mandrel is also prevented. In a mandrel which is not pre-loaded to balance stresses within the mandrel, elongation or other deformation may occur which is insufficient to cause failure or fracture but which is sufficient to cause the formation of internal threads which are not true.

After the nut has been forced through the die the mandrel is disassembled and the nut is screwed off the mandrel as a finished piece. Variations in procedure and in the apparatus used to carry out the method of the present invention will be apparent to one skilled in the art in view of the foregoing. For example, the work piece may be heated in place if the temperatures involved are not detrimental to the surrounding material; cold forming may be used when the material of the work piece is suitable; and pre-loading may be predetermined and set into the mandrel by a hydraulic plunger or the like rather than a threaded member as shown. Other and similar variations in apparatus and procedure may be utilized within the scope of the invention.

Thus, the present invention provides a method and apparatus for forming internally threaded pieces, such as nuts, by die forming which minimizes tool breakage or failure, and which permits the quick and efficient manufacture of internally threaded pieces which are accurately formed to the desired internal thread and external configuration and dimensions.

What is claimed is:

1. The method of forming internal threads in a work piece including the steps of: placing the workpiece to be threaded about a threaded mandrel; placing at least the threaded portion of said mandrel in axial compression; and forcing said mandrel carrying said nut through a die to thereby cause said nut blank to assume the shape of said thread of said mandrel.

2. The method of forming internal threads in a nut or the like including the steps of: placing the nut blank to be threaded upon a threaded portion of a threaded former which is in compression; placing at least the threaded portion of said former in axial compression; and drawing said former through a die to thereby cause said nut blank to assume the shape of said former.

3. The method of forming internal threads in a nut comprising the steps of: positioning a nut blank to be threaded about a mandrel having male threads mateable with the female threads to be formed; exerting a pre-loading axial compressive force upon at least the threaded portion of said male threaded member; forcing said pre-loaded mandrel and nut blank through a die to exert a radial compressive load upon said nut blank whereby said nut blank assumes the desired internally threaded configuration.

4. The method of forming an internally threaded piece such as a nut comprising the steps of: positioning a nut blank to be threaded about a mandrel having male threads mateable with the female threads to be formed; exerting an axial compressive pre-loading force upon at least the threaded portion of said mandrel; forcing said pre-loaded mandrel and nut blank through a die, said die having an internal configuration equal to the desired external configuration greater than said internal configuration of said die; said pre-loading force being sufficient to counteract tensile forces resulting within the threaded portion of said mandrel due to radial compression by said nut blank, whereby said nut blank assumes the desired external and internally threaded configuration.

References Cited in the file of this patent

UNITED STATES PATENTS 1,114,158   Lovell ---------------- Oct. 20, 1914